(12) United States Patent
Feng

(10) Patent No.: US 8,334,795 B2
(45) Date of Patent: Dec. 18, 2012

(54) INPUT SYSTEM

(75) Inventor: Lan-Yi Feng, Shenzhen (CN)

(73) Assignees: Hong Fu Jin Precision Indsutry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 216 days.

(21) Appl. No.: 12/845,739

(22) Filed: Jul. 29, 2010

(65) Prior Publication Data

US 2011/0285552 A1  Nov. 24, 2011

(30) Foreign Application Priority Data

May 24, 2010  (CN) .......................... 2010 1 0181456

(51) Int. Cl.
  *H03M 11/10*  (2006.01)
(52) U.S. Cl. ........................................................ 341/22
(58) Field of Classification Search ................... 341/22; 340/286.01; 345/168; 719/330
  See application file for complete search history.

(56) References Cited

U.S. PATENT DOCUMENTS 6,005,490 A * 12/1999 Higashihara ............... 340/13.31

* cited by examiner

*Primary Examiner* — Robert Pascal
*Assistant Examiner* — Khiem Nguyen
(74) *Attorney, Agent, or Firm* — Altis Law Group, Inc.

(57) ABSTRACT

An input system includes a keyboard, an emitting apparatus, and a receiving apparatus. The keyboard includes a number of signal pins. The emitting apparatus includes a number of keys, an encoder, and an emitter. When one of the keys is pressed, the encoder outputs a first signal and the emitter converts the first signal to a wireless signal. The receiving apparatus includes a decoder and a receiver. The decoder includes a number of outputs. The outputs of the decoder are connected to the signal pins of the keyboard respectively. The receiver receives the wireless signal of the emitter and reconverts the wireless signal to the first signal. The decoder decodes the first signal and the outputs of the decoder outputs a decoded signal. The decoded signal is used to control voltage level of the signal pins.

8 Claims, 3 Drawing Sheets

INPUT SYSTEM

BACKGROUND

1. Technical Field

The present disclosure relates to an input system.

2. Description of Related Art

Input devices of computers such as keyboards include instructions, symbols, and characters. These instructions, symbols, and characters are typed into the computer through the keyboards. When teachers or presenters use projectors to show something, teachers or presenters have to enter data with the keyboards to activate functions of "Page down", "Page up", "Full screen", and so on, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
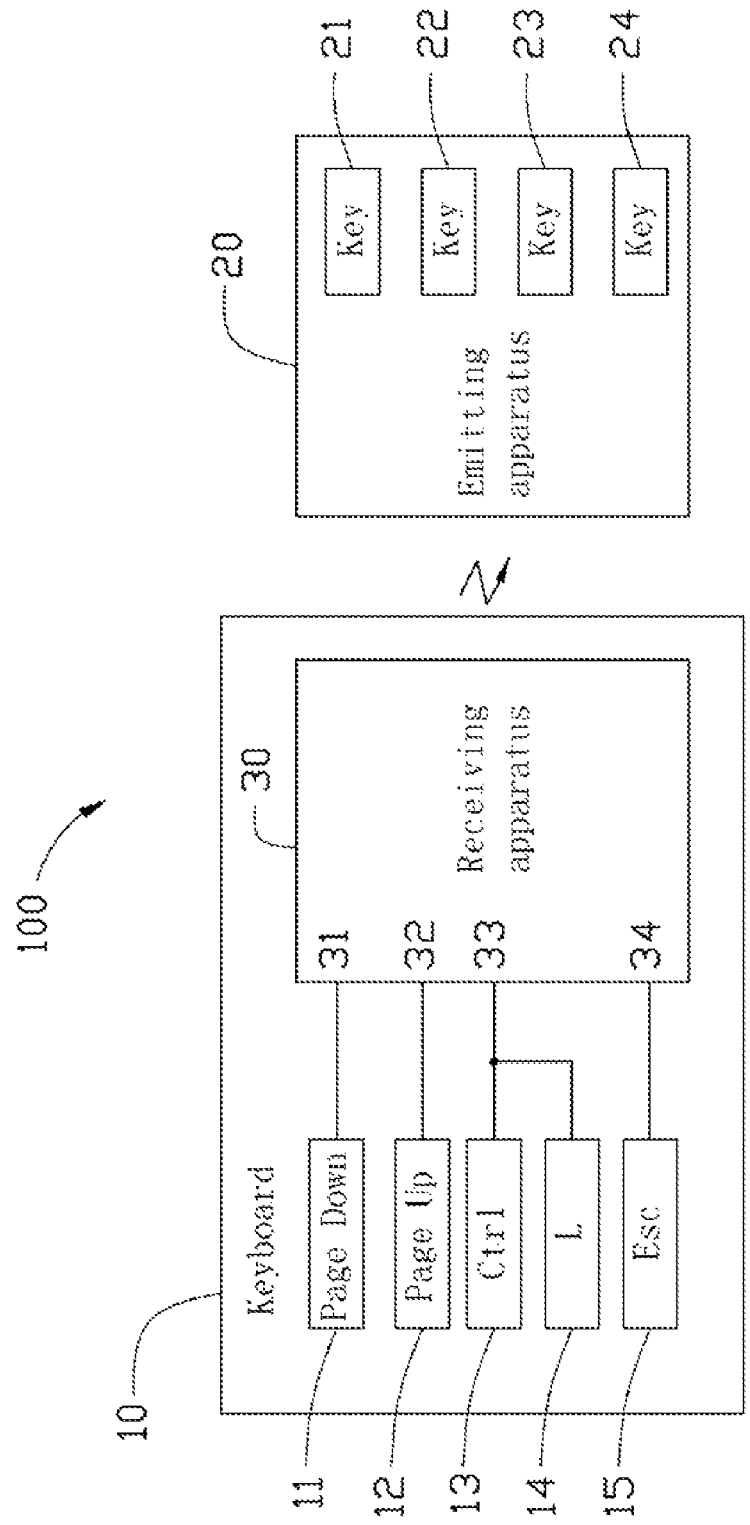
FIG. 1 is a schematic block diagram of an exemplary embodiment of an input system. The input system includes an emitting apparatus, a receiving apparatus, and a keyboard.

Referring to FIG. 1, an exemplary embodiment of an input system 100 includes a keyboard 10, an emitting apparatus 20, and a receiving apparatus 30.

The emitting apparatus 20 includes four keys 21-24. The emitting apparatus 20 outputs a wireless signal when one of the keys 21-24 is pressed.

The receiving apparatus 30 is mounted in the keyboard 10. The receiving apparatus 30 includes four outputs 31-34. The output 31 is connected to a signal pin of the "Page down" key 11 of the keyboard 10. The output 32 is connected to a signal pin of the "Page up" key 12 of the keyboard 10. The output 33 is connected to signal pins of the "Ctrl" key 13 and "L" key 14 of the keyboard 10. The output 34 is connected to a signal pin of the "Esc" key 15 of the keyboard 10.

The outputs 31-34 of the receiving apparatus 30 cooperate to output a decoded signal according to the wireless signal of the emitting apparatus 20, to activate functions of the keys of the keyboard 10.

Figure 2:
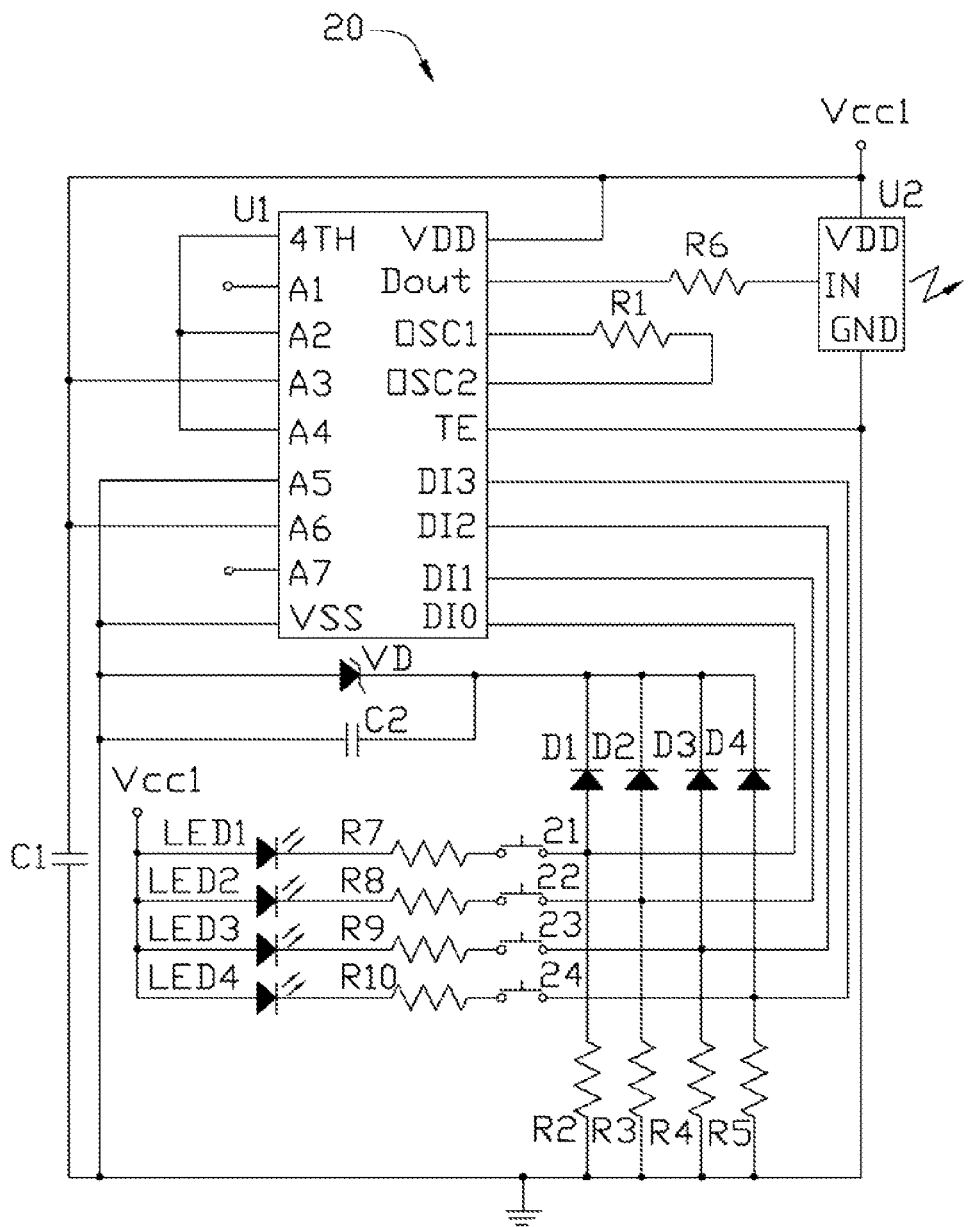
FIG. 2 is a circuit diagram of the emitting apparatus of FIG. 1.

Referring to FIG. 2, the emitting apparatus 20 includes an encoder U1, an emitter U2, four light emitting diodes LED1-LED4, four keys 21-24, four diodes D1-D4, a Zener diode VD, resistors R1-R10, and capacitors C1 and C2.

The encoder U1 is an AX5326 encoder. The encoder U1 includes a fourth output 4TH, seven code inputs A1-A7, a ground terminal VSS, four inputs DI0-DI3, an enable terminal TE, two oscillator inputs OSC1 and OSC2, an code output Dout, and a power terminal VDD.

The power terminal VDD, the code inputs A3 and A6 are connected to a first power source Vcc1. The voltage of the first power source Vcc1 is 12 volts (V). The code input A6 is also grounded through the capacitor C1. The fourth output 4TH is connected to the code inputs A2 and A4. The code input A5, the ground terminal VSS, and the enable terminal TE are grounded. The code inputs A1 and A7 are floating. The oscillator input OSC1 is connected to the oscillator input OSC2 through the resistor R1. The input DI0 is grounded through the resistor R2. The input DI1 is grounded through the resistor R3. The input DI2 is grounded through the resistor R4. The input DI3 is grounded through the resistor R5. The encoder U1 works when the enable terminal TE is at a low voltage level.

The emitter U2 is an HS101 emitter. The emitter U2 includes an input IN, a power terminal VDD, and a ground terminal GND. The input IN of the emitter U2 is connected to the code output Dout of the encoder U1 through the resistor R6. The power terminal VDD of the emitter U2 is connected to the first power source Vcc1. The ground terminal GND of the emitter U2 is grounded.

Anodes of the light emitting diodes LED1-LED4 are connected to the first power source Vcc1. A cathode of the light emitting diode LED1 is connected to the input DI0 of the encoder U1 through the resistor R7 and the key 21 in series. A cathode of the light emitting diode LED2 is connected to the input DI1 of the encoder U1 through the resistor R8 and the key 22 in series. A cathode of the light emitting diode LED3 is connected to the input DI2 of the encoder U1 through the resistor R9 and the key 23 in series. A cathode of the light emitting diode LED4 is connected to the input DI3 of the encoder U1 through the resistor R10 and the key 24 in series.

An anode of the diode D1 is connected to the input DI0 of the encoder U1. An anode of the diode D2 is connected to the input DI1 of the encoder U1. An anode of the diode D3 is connected to the input DI2 of the encoder U1. An anode of the diode D4 is connected to the input DI3 of the encoder U1. Cathodes of the diodes D1-D4 are connected to a cathode of the Zener diode VD. The cathode of the Zener diode VD is grounded through the capacitor C2. An anode of the Zener diode VD is grounded.

Figure 3:
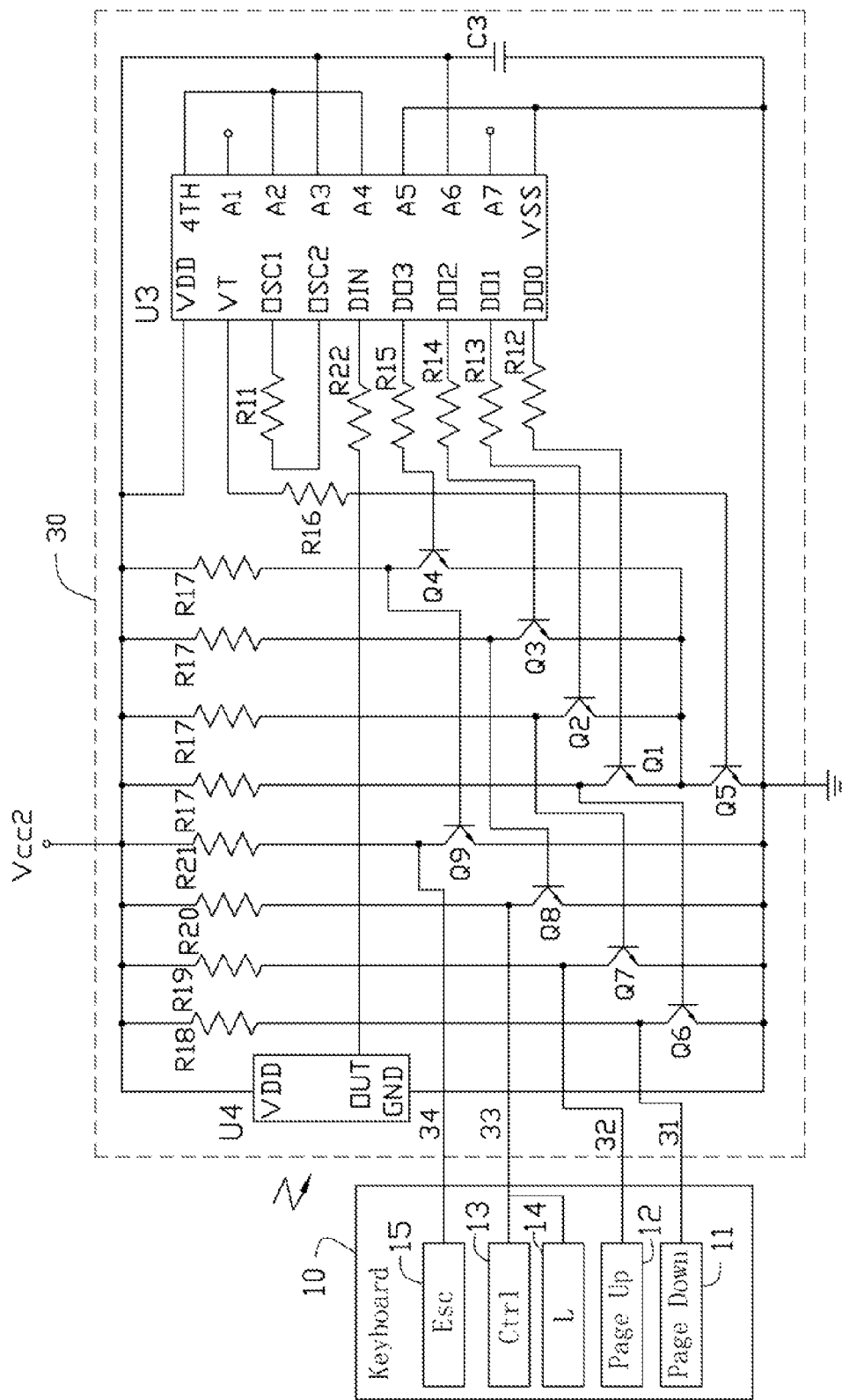
FIG. 3 is a circuit diagram of the receiving apparatus connected to the keyboard of FIG. 1.

Referring to FIG. 3, the receiving apparatus 30 includes a decoder U3, a receiver U4, transistors Q1-Q9, a capacitor C3, and resistors R11-R22.

The decoder U3 is an AX5327 decoder. The decoder U3 includes a fourth output 4TH, seven code inputs A1-A7, a ground terminal VSS, four outputs DO0-DO3, a code input DIN, two oscillator inputs OSC1 and OSC2, an enable output VT, and a power terminal VDD.

The power terminal VDD, the code inputs A3 and A6 are connected to a second power source Vcc2. The voltage of the second power source Vcc2 is 6V. The code input A6 is also grounded through the capacitor C3. The fourth output 4TH is connected to the code inputs A2 and A4. The code input A5 and the ground terminal VSS are grounded. The code inputs A1 and A7 are floating. The oscillator input OSC1 is connected to the oscillator input OSC2 through the resistor R11. The output DO0 is connected to a base of the transistor Q1 through the resistor R12. The output DO1 is connected to a base of the transistor Q2 through the resistor R13. The output DO2 is connected to a base of the transistor Q3 through the resistor R14. The output DO3 is connected to a base of the transistor Q4 through the resistor R15. The enable output VT is connected to a base of the transistor Q5 through the resistor R16.

A collector of each of the transistors Q1-Q4 is connected to the second power source Vcc2 through a resistor R17. An emitter of each of the transistors Q1-Q4 is connected to a collector of the transistor Q5. An emitter of the transistor Q5 is grounded.

A base of the transistor Q6 is connected to the collector of the transistor Q1. A collector of the transistor Q6 is connected to the second power source Vcc2 through the resistor R18. An emitter of the transistor Q6 is grounded. The collector of the transistor Q6 functions as the output 31 of the receiving apparatus 30 and is connected to the signal pin of the "Page down" key 11 of the keyboard 10.

A base of the transistor Q7 is connected to the collector of the transistor Q2. A collector of the transistor Q7 is connected to the second power source Vcc2 through the resistor R19. An emitter of the transistor Q7 is grounded. The collector of the transistor Q7 functions as the output 32 of the receiving apparatus 30 and is connected to the signal pin of the "Page up" key 12 of the keyboard 10.

A base of the transistor Q8 is connected to the collector of the transistor Q3. A collector of the transistor Q8 is connected to the second power source Vcc2 through the resistor R20. An emitter of the transistor Q8 is grounded. The collector of the transistor Q8 functions as the output 33 of the receiving apparatus 30 and is connected to the signal pins of the "Ctrl" key 13 and the "L" key 14 of the keyboard 10.

A base of the transistor Q9 is connected to the collector of the transistor Q4. A collector of the transistor Q9 is connected to the second power source Vcc2 through the resistor R21. An emitter of the transistor Q9 is grounded. The collector of the transistor Q9 functions as the output 34 of the receiving apparatus 30 and is connected to the signal pin of the "Esc" key 15 of the keyboard 10.

The receiver U4 is an HS201 emitter. The receiver U4 includes an output OUT, a power terminal VDD, and a ground terminal GND. The output OUT of the receiver U4 is connected to the code input DIN of the decoder U3 through the resistor R22. The power terminal VDD of the receiver U4 is connected to the second power source Vcc2. The ground terminal GND of the receiver U4 is grounded.

The enable output VT and the outputs DO0-DO3 control the transistors Q1-Q5 to turn on or turn off. The enable output VT is at a high voltage level when the code input DIN receives a signal from output OUT of the receiver U4. The transistor Q5 is turned on. One of the transistors Q1-Q4 is turned on when a corresponding output of the decoder U3 is at a high voltage level. The enable output VT and the transistor Q5 are used to disable outputs DO0-DO3 in response to the code inputs A1-A7 of the decoder U3.

When the key 21 of the emitting apparatus 20 is pressed, the light emitting diode LED1 is turned on and the input DI0 of the encoder U1 is at a high voltage level. The inputs DI1-DI3 of the encoder U1 are at low voltage level. The code output Dout of the encoder U1 outputs a first signal "1000". The emitter U2 converts the first signal to a wireless signal.

The receiver U4 receives the wireless signal and reconverts the wireless signal to the first signal. The code input DIN of the decoder U3 receives the first signal. The decoder U3 decodes the first signal and the outputs DO0-DO3 output a decoded signal. The output DO0 and the enable output VT are at high voltage level when the first signal is "1000". At the same time, the outputs DO1-DO3 are at low voltage level.

The transistors Q1 and Q5 are turned on and the transistors Q2-Q4 are turned off. The collector of the transistor Q1 is at a low voltage level and collectors of the transistors Q2-Q4 are at high voltage level. The transistor Q6 is turned off and the transistors Q7-Q9 are turned on. The collector of the transistor Q6 is at a high voltage level. The signal pin of the "Page down" key 11 is at a high voltage level and function of the "Page down" key 11 is activated.

Similarly, when one of the keys 22-24 of the emitting apparatus 20 is pressed, one of the outputs 32-34 of the receiving apparatus 30 is at a high voltage level. Thus, functions of the corresponding keys are activated.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An input system, comprising:
   a keyboard comprising a plurality of keys and a plurality of signal pins corresponding to the keyboard keys;
   an emitting apparatus comprising a plurality of keys, an encoder, and an emitter, wherein when one of the keys of the emitting apparatus is pressed, the encoder outputs a first signal, the emitter converts the first signal to a wireless signal; and
   a receiving apparatus mounted in the keyboard, and comprising a decoder and a receiver, wherein the decoder comprises a plurality of outputs connected to the plurality of signal pins of the keyboard respectively, the receiver receives the wireless signal of the emitter and reconverts the wireless signal to the first signal, the decoder decodes the first signal, and the outputs of the decoder output a decoded signal, to control voltage level of the plurality of signal pins.

2. The input system of claim 1, wherein the plurality of keys of the emitting apparatus comprises a first key and a second key, the encoder further comprises a power terminal, a ground terminal, a first input, a second input, an enable terminal, a first oscillator input, a second oscillator input, and a code output, the power terminal is connected to a first power source, the ground terminal and the enable terminal are grounded, the first oscillator input is connected to the second oscillator input through a first resistor, the first input is grounded through a second resistor, the second input is grounded through a third resistor, the emitter comprises an input, a power terminal, and a ground terminal, the input of the emitter is connected to the code output of the encoder through a fourth resistor, the power terminal of the emitter is connected to the first power source, the ground terminal of the emitter is grounded, a first terminal of the first key is connected to the first power source through a fifth resistor, a second terminal of the first key is connected to the first input of the encoder, a first terminal of the second key is connected to the first power source through a sixth resistor, a second terminal of the second key is connected to the second input of the encoder.

3. The input system of claim 2, wherein the emitting apparatus further comprises a first light emitting diode, a second light emitting diode, an anode of the first light emitting diode is connected to the first power source, a cathode of the first light emitting diode is connected to the first terminal of the first key through the fifth resistor, an anode of the second light emitting diode is connected to the first power source, a cathode of the second light emitting diode is connected to the first terminal of the second key through the sixth resistor.

4. The input system of claim 2, wherein the receiving apparatus further comprises first to fifth transistors, the decoder further comprises a power terminal, a ground terminal, a code input, a first oscillator input, a second oscillator input, and an enable output, the plurality of outputs of the decoder comprises a first output and a second output, the power terminal is connected to a second power source, the ground terminal is grounded, the first oscillator input is connected to the second oscillator input through a seventh resistor, the first output is connected to a base of the first transistor through an eighth resistor, the second output is connected to a base of the second transistor through a ninth resistor, the enable output is connected to a base of the third transistor through a tenth resistor, a collector of the first transistor is connected to the second power source through an eleventh resistor, a collector of the second transistor is connected to the second power source through a twelfth resistor, emitters of the first and second transistors are connected to a collector of the third transistor, an emitter of the third transistor is grounded, a base of the fourth transistor is connected to the collector of the first transistor, a collector of the fourth transistor is connected to the second power source through a thirteenth resistor and connected to a first signal pin of the keyboard, an emitter of the fourth transistor is grounded, a base of the fifth transistor is connected to the collector of the second transistor, a collector of the fifth transistor is connected to the second power source through a fourteenth resistor and connected to a second signal pin of the keyboard, an emitter of the fifth transistor is grounded, the receiver comprises an output, a power terminal, and a ground terminal, the output of the receiver is connected to the code input of the decoder through a fifteenth resistor, the power terminal of the receiver is connected to the second power source, the ground terminal of the receiver is grounded.

5. An input system, comprising:
  a keyboard comprising a first plurality of keys;
  a wireless receiving apparatus mounted in the keyboard and connected to specific keys of the plurality of keys on the keyboard; and
  a wireless remote emitting apparatus comprising a second plurality of keys matching the specific keys on the keyboard;
  wherein when one of the specific keys on the wireless remote emitting apparatus is pressed, information from the remote wireless emitting apparatus is wirelessly transmitted to the wireless receiving apparatus and the wireless receiving apparatus activates a corresponding one of the specific keys on the keyboard.

6. The input system of claim 5, wherein the second plurality of keys of the wireless remote emitting apparatus comprises a first key and a second key, the wireless remote emitting apparatus further comprises an emitter and an encoder, the encoder comprises a power terminal, a ground terminal, a first input, a second input, an enable terminal, a first oscillator input, a second oscillator input, and a code output, the power terminal is connected to a first power source, the ground terminal and the enable terminal are grounded, the first oscillator input is connected to the second oscillator input through a first resistor, the first input is grounded through a second resistor, the second input is grounded through a third resistor, the emitter comprises an input, a power terminal, and a ground terminal, the input of the emitter is connected to the code output of the encoder through a fourth resistor, the power terminal of the emitter is connected to the first power source, the ground terminal of the emitter is grounded, a first terminal of the first key is connected to the first power source through a fifth resistor, a second terminal of the first key is connected to the first input of the encoder, a first terminal of the second key is connected to the first power source through a sixth resistor, a second terminal of the second key is connected to the second input of the encoder.

7. The input system of claim 6, wherein the wireless remote emitting apparatus further comprises a first light emitting diode, a second light emitting diode, an anode of the first light emitting diode is connected to the first power source, a cathode of the first light emitting diode is connected to the first terminal of the first key through the fifth resistor, an anode of the second light emitting diode is connected to the first power source, a cathode of the second light emitting diode is connected to the first terminal of the second key through the sixth resistor.

8. The input system of claim 6, wherein the wireless receiving apparatus further comprises first to fifth transistors, a decoder, and a receiver, the decoder further comprises a power terminal, a ground terminal, a code input, a first oscillator input, a second oscillator input, a first output, a second output, and an enable output, the power terminal is connected to a second power source, the ground terminal is grounded, the first oscillator input is connected to the second oscillator input through a seventh resistor, the first output is connected to a base of the first transistor through an eighth resistor, the second output is connected to a base of the second transistor through a ninth resistor, the enable output is connected to a base of the third transistor through a tenth resistor, a collector of the first transistor is connected to the second power source through an eleventh resistor, a collector of the second transistor is connected to the second power source through a twelfth resistor, emitters of the first and second transistors are connected to a collector of the third transistor, an emitter of the third transistor is grounded, a base of the fourth transistor is connected to the collector of the first transistor, a collector of the fourth transistor is connected to the second power source through a thirteenth resistor and connected to a first signal pin of the keyboard, an emitter of the fourth transistor is grounded, a base of the fifth transistor is connected to the collector of the second transistor, a collector of the fifth transistor is connected to the second power source through a fourteenth resistor and connected to a second signal pin of the keyboard, an emitter of the fifth transistor is grounded, the receiver comprises an output, a power terminal, and a ground terminal, the output of the receiver is connected to the code input of the decoder through a fifteenth resistor, the power terminal of the receiver is connected to the second power source, the ground terminal of the receiver is grounded.

* * * * *